(12) United States Patent
Pierron et al.

(10) Patent No.: US 11,397,025 B2
(45) Date of Patent: Jul. 26, 2022

(54) ELECTRIC HEATING DEVICE, CORRESPONDING HEATING CIRCUIT AND METHOD FOR MANAGING THE TEMPERATURE

(71) Applicant: Valeo Systemes Thermiques, Le Mesnil-Saint-Denis (FR)

(72) Inventors: Frèdèric Pierron, Le Mesnil Saint Denis (FR); Laurent Tellier, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 358 days.

(21) Appl. No.: 16/483,537

(22) PCT Filed: Jan. 31, 2018

(86) PCT No.: PCT/FR2018/050221
§ 371 (c)(1),
(2) Date: Aug. 5, 2019

(87) PCT Pub. No.: WO2018/142064
PCT Pub. Date: Aug. 9, 2018

(65) Prior Publication Data
US 2020/0025411 A1 Jan. 23, 2020

(30) Foreign Application Priority Data

Feb. 6, 2017 (FR) ...................... 1750960

(51) Int. Cl.
*F24H 1/00* (2022.01)
*F24D 19/10* (2006.01)
(Continued)

(52) U.S. Cl.
CPC ........... *F24H 1/009* (2013.01); *B60H 1/2221* (2013.01); *F24D 19/1051* (2013.01);
(Continued)

(58) Field of Classification Search
None
See application file for complete search history.

(56) References Cited

U.S. PATENT DOCUMENTS 2,266,216 A * 12/1941 Kimberlin ............... F02N 19/10
392/489
3,626,148 A * 12/1971 Woytowich ............. F02N 19/10
219/208
(Continued)

FOREIGN PATENT DOCUMENTS

CN 1197015 A 10/1998
CN 202496072 U 10/2012
(Continued)

OTHER PUBLICATIONS

The Second Office Action issued in corresponding Chinese Patent Application No. 201880010511.8, dated Apr. 1, 2021 (24 pages).
(Continued)

*Primary Examiner* — Thor S Campbell
(74) *Attorney, Agent, or Firm* — Osha Bergman Watanabe & Burton LLP (57) ABSTRACT

The invention relates to an electric fluid heating device (1) comprising: at least one fluid inlet (7), at least one fluid outlet (11), at least one heating element (13), at least one first temperature sensor (21) for measuring the temperature of said at least one heating element (13), and a control module (15) of the at least one heating element (13). According to the invention, the device (1) comprises at least a second temperature sensor (23) for measuring the temperature of the fluid at the at least one outlet (11), and the control module (15) comprises at least one processing means (17, 19, 35) for: using the temperature information ($T_{21}$, $T_{23}$) from the temperature sensors (21, 24), and for generating a command for the at least one heating element (13) according to the
(Continued)

temperature information ($T_{21}$, $T_{23}$). The invention also relates to an associated heating circuit and method for managing the temperature.

14 Claims, 3 Drawing Sheets

(51) Int. Cl.
*F24H 9/20* (2022.01)
*B60H 1/22* (2006.01)

(52) U.S. Cl.
CPC .... *B60H 2001/2256* (2013.01); *F24H 9/2028* (2013.01); *F24H 9/2071* (2013.01)

(56) References Cited

U.S. PATENT DOCUMENTS

| | | | | |
|---|---|---|---|---|
| 4,208,570 | A * | 6/1980 | Rynard | F02N 19/10 123/142.5 E |
| 4,818,843 | A * | 4/1989 | Swiatosz | A62B 27/00 392/397 |
| 5,428,964 | A * | 7/1995 | Lobdell | G05D 27/02 62/176.6 |
| 5,791,407 | A * | 8/1998 | Hammons | B60H 1/2221 123/142.5 E |
| 5,900,070 | A * | 5/1999 | Jarvis | A47L 15/4204 134/18 |
| 6,055,360 | A | 4/2000 | Inoue et al. | |
| 6,166,351 | A * | 12/2000 | Yamamoto | B60H 1/00064 219/202 |
| 9,127,762 | B2 * | 9/2015 | Oh | F16H 57/0417 |
| 10,919,362 | B2 * | 2/2021 | Lim | B60H 1/00392 |
| 2001/0043808 | A1 * | 11/2001 | Matsunaga | B60H 1/2221 392/494 |
| 2004/0252986 | A1 * | 12/2004 | Ito | B60H 1/2225 392/485 |
| 2009/0107974 | A1 * | 4/2009 | Testa | B60H 1/034 219/208 |
| 2011/0180617 | A1 * | 7/2011 | Saito | F24H 3/0429 236/49.3 |
| 2012/0204374 | A1 * | 8/2012 | Shank | B60S 1/482 15/250.01 |
| 2012/0224839 | A1 * | 9/2012 | Zorzetto | F02M 53/06 392/485 |
| 2012/0295141 | A1 * | 11/2012 | Allen | B60L 58/27 429/62 |
| 2012/0315024 | A1 * | 12/2012 | Obst | F24H 1/121 392/465 |
| 2013/0026151 | A1 * | 1/2013 | Adachi | B60H 1/2221 219/202 |
| 2014/0086566 | A1 * | 3/2014 | Waechter | F24H 1/009 392/479 |
| 2015/0122798 | A1 * | 5/2015 | Maemura | B60H 1/2218 219/510 |
| 2015/0122899 | A1 | 5/2015 | Kaneko et al. | |
| 2015/0129576 | A1 * | 5/2015 | Maemura | H05B 1/02 219/494 |
| 2015/0174988 | A1 * | 6/2015 | Collmer | B60H 1/2209 165/154 |
| 2015/0377513 | A1 * | 12/2015 | Hammer | H05B 1/0244 219/504 |
| 2016/0167624 | A1 * | 6/2016 | Lansinger | F24H 1/121 219/202 |
| 2016/0195341 | A1 * | 7/2016 | Kominami | B60H 1/2221 165/293 |
| 2018/0186215 | A1 * | 7/2018 | Ogasawara | F24H 1/009 |

FOREIGN PATENT DOCUMENTS

| | | |
|---|---|---|
| DE | 112014006219 T5 | 11/2016 |
| FR | 3002493 A1 | 8/2014 |
| FR | 3026262 A1 | 3/2016 |
| WO | 9746928 A1 | 12/1997 |

OTHER PUBLICATIONS

International Search Report and Written Opinion issued in corresponding PCT Application No. PCT/FR2018/050221, dated Apr. 19, 2018 (13 Pages with English Translation of International Search Report).

* cited by examiner

ELECTRIC HEATING DEVICE, CORRESPONDING HEATING CIRCUIT AND METHOD FOR MANAGING THE TEMPERATURE

The invention relates to an electric fluid heating device for a motor vehicle. The invention also relates to a heating circuit comprising such a heating device. The invention is also applicable to the heating and/or air conditioning units of motor vehicles comprising such a heating device. The invention further relates to a method for managing the temperature of a fluid inside such an electric heating device.

In particular, in the case of an electric or hybrid vehicle, a circuit can be provided for heating a fluid, such as heat transfer liquid, for heating the interior. Such a heating circuit generally comprises an electric heating device, also called heater or electric heater, that allows the interior of the vehicle to be heated by heating the heat transfer liquid of the heating circuit through the Joule effect. This heating circuit also integrates at least one radiator for dissipating this heat toward the interior.

The electric heater comprises one or more heating elements intended to be in contact with the fluid, such as heat transfer liquid, to be heated.

In order to manage the thermal heating power, such a heater generally integrates electronic power and control components for injecting electric power into the heating elements that corresponds to a setpoint value addressed by a central unit of the motor vehicle equipped with such a heater. With respect to the current heaters that are available on the market, the temperature is managed by the motor vehicle manufacturer and is generally outside the control of the heater.

According to one known solution, a temperature sensor is implemented directly on the heating element of the heater to control the temperature of the heating element. In general, such a sensor is used to avoid overheating or an abnormal temperature of the heating element. In other words, the temperature sensor is used as an element for detecting a particular event, such as an excessive temperature. The vehicle network can interpret this event in order to deactivate the overheating heating element or heating elements. However, this temperature information is not used within the heater to control the temperature of the liquid circulating in the heater.

The aim of the present invention is a variant for managing the temperature of the fluid, such as heat transfer liquid, at the outlet of the heater in order to reach the correct temperature level according to the addressed setpoint, while reducing the risk of overheating the fluid.

To this end, the aim of the invention is an electric fluid heating device for a motor vehicle, comprising:
- at least one fluid inlet;
- at least one fluid outlet;
- at least one heating element for electrically heating the fluid;
- at least one first temperature sensor arranged so as to measure the temperature of said at least one heating element; and
- a control module for said at least one heating element.

According to the invention,
said device further comprises at least one second temperature sensor arranged so as to measure the temperature of the fluid at said at least one outlet of said device; and
the control module comprises at least one processing means for:
- using the temperature information of the first and second temperature sensors; and for
- generating a command for said at least one heating element as a function of the temperature information of the first and second temperature sensors, so as to regulate the temperature of the fluid inside the heating device.

Thus, by correlating the temperature information of the heating elements and the temperature at the outlet of said device, the control module integrated in said device can interpret this information to modify the control of the heating elements in order to regulate the temperature of the fluid at the outlet, while minimizing the risks of overheating the heating elements.

Said device can further comprise one or more of the following features, taken separately or in combination:
- said at least one second temperature sensor is molded on said device;
- said at least one outlet is produced in the form of an outlet pipe;
- said at least one second temperature sensor is arranged on the outlet pipe;
- said at least one second temperature sensor is arranged in the vicinity of the outlet pipe;
- said at least one first temperature sensor is fixed on said at least one heating element;
- said at least one heating element comprises at least one heating resistor;
- at least one temperature sensor comprises a temperature sensitive element;
- the temperature sensitive element of said at least one second temperature sensor is arranged so as to be immersed in the fluid during operation of said device;
- the temperature sensitive element is a negative temperature coefficient thermistor;
- the temperature sensitive element of said at least one temperature sensor is electrically connected to the control module;
- the control module comprises at least one comparator configured to:
  - receive a heating setpoint at a first inlet; and to
  - receive electric information at a second input representing the temperature of the fluid at said at least one outlet measured by said at least one second temperature sensor;
- the comparator is configured to compare the electric information representing the temperature of the fluid with the heating setpoint;
- at least one processing means of the control module is configured to determine a signal for controlling and/or supplying said at least one heating element as a function of the result of the comparison between the electric information representing the temperature of the fluid and the heating setpoint;
- the control and/or supply signal comprises at least one item of information relating to electric power to be injected into each heating element;
- the control and/or supply signal comprises at least one item of pulse width modulation (PWM) information;
- said device comprises at least one microcontroller and at least one supply switch configured to be controlled by the microcontroller;
- said device comprises:
  - a first fluid outlet;
  - a second fluid outlet;

a first heating element connected to the first fluid outlet, configured to electrically heat, to a first temperature, a portion of the heat transfer liquid intended to flow through the first outlet;

a second heating element connected to the second fluid outlet, configured to electrically heat, to a second temperature different from the first temperature, another portion of the heat transfer liquid intended to flow through the second outlet;

for each heating element, a first associated temperature sensor arranged so as to measure the temperature of the associated heating element; and for each fluid outlet, a second associated temperature sensor arranged so as to measure the temperature of the fluid at the associated outlet.

The invention also relates to a heating circuit for a motor vehicle comprising at least one electric heating device as previously defined.

According to one aspect of the invention, said circuit further comprises at least one first and one second heat exchanger configured to diffuse heat toward two distinct regions of the interior of the vehicle. The first fluid outlet of said device is connected to the first heat exchanger, and the second fluid outlet of said device is connected to the second heat exchanger.

According to another aspect of the invention, the two heat exchangers are integrated in the same heat diffusion component.

A further aim of the invention is a method for managing the temperature of a fluid inside an electric heating device as previously described.

According to the invention, said method comprises the following steps:

measuring the temperature of each heating element;

transmitting at least one item of electric information representing the temperature of the associated heating element;

measuring the temperature of the fluid at each outlet of said device;

transmitting at least one item of electric information representing the temperature of the fluid at each outlet of said device;

determining, for each heating element, a signal for controlling and/or supplying the heating element as a function of temperature information of the heating elements and of said at least one outlet, so as to regulate the temperature of the fluid inside the heating device.

More specifically:

each first temperature sensor measures the temperature of an associated heating element;

each first temperature sensor transmits at least one item of electric information representing the temperature of the associated heating element to the control module;

each second temperature sensor measures the temperature of the fluid on at least one associated outlet of said device;

each second temperature sensor transmits at least one item of electric information representing the temperature of the fluid at said at least one outlet of said device to the control module;

the control module determines, for each heating element, a signal for controlling and/or supplying the heating element as a function of temperature information of the first and second temperature sensors, so as to regulate the temperature of the fluid inside the heating device.

The temperature is therefore managed directly inside the heating device and not in the vehicle network.

Said method can further comprise one or more of the following features, taken separately or in combination:

said method comprises a step of comparing the temperature measured by a first temperature sensor with a threshold temperature;

said method comprises a step of comparing the temperature measured by a second temperature sensor with a heating setpoint;

said method comprises a step in which the control module determines which heating element must be activated as a function of the temperature information of the first and second temperature sensors;

the control module comprises at least one microcontroller and at least one supply switch for each heating element, and the microcontroller controls each supply switch so as to activate or deactivate the associated heating element.

Further features and advantages of the invention will become more clearly apparent upon reading the following description, which is provided by way of a non-limiting illustrative example, and with reference to the accompanying drawings, in which.

Throughout these figures, substantially identical elements use the same reference signs.

The following embodiments are examples. Even though the description refers to one or more embodiments, this does not necessarily mean that each reference relates to the same embodiment or that the features are only applicable to a single embodiment. Simple features of various embodiments also can be combined or interchanged in order to provide other embodiments.

Throughout the description, some elements can be indexed, such as, for example, first element or second element. In this case, it is simple indexing for differentiating and denoting elements that are similar but not identical. This indexing does not imply a priority of one element over another and such denominations can be easily interchanged without departing from the scope of the present description. This indexing also does not imply a time order.

Figure 1:
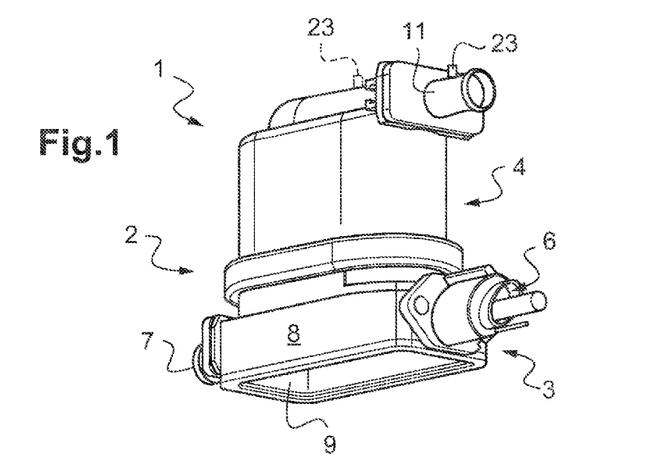
FIG. 1 is a perspective view of an electric heating device according to a first embodiment.

With reference to FIG. 1, the invention relates to an electric fluid heating device 1 of a heating circuit for a motor vehicle, in particular for a heating and/or air conditioning unit.

Device and Heating Circuit

First Embodiment

FIG. 1 shows a first embodiment of an electric fluid heating device 1 for a motor vehicle for a heating and/or air conditioning unit.

The electric heating device 1 is, for example, an additional heating device for heating a heat transfer liquid, such as water, circulating in a water heating circuit for heating the interior of an electric vehicle.

In the present description, the electric heating device 1 is also called heater 1. Reference is also made to an electric radiator. Throughout the remainder of the description, reference will be made to a heat transfer liquid. Of course, the invention can be applied to any other fluid.

The heater 1 that is shown comprises an inlet casing 3 and an outlet casing 4. In particular, the heater 1 comprises a housing 2 comprising the inlet casing 3 and the outlet casing 4 covering the inlet casing 3.

The inlet casing 3 defines an internal space, in which electric and/or electronic components can be mounted, for example, combined on a power electronics board (not shown).

This inlet casing 3 also comprises a power and control cable input 6, as well as at least one heat transfer liquid inlet or intake 7. The inlet 7 can be produced in the form of an intake pipe 7, for example, arranged as a projection on the inlet casing 3.

The inlet casing 3 of the housing 2 can be formed by a body or a base 8 that is open on one face and by a lid or cover 9 closing the body or base 8, so as to jointly define, with this body 8, the internal space containing the electric and/or electronic components. The lid 9 can have a generally substantially flat shape.

The heat transfer liquid received via the inlet 7 is intended to be directed by channels (not shown in the figures) toward the outlet casing 4 of the housing 2, so as to be heated therein.

Of course, the internal space in which the electric and/or electronic components are mounted is completely separate and isolated from the channels (not shown) through which the heat transfer liquid is intended to pass.

The outlet casing 4 of the housing 2 covers the inlet casing 3 by being sealably secured thereto, so that the heat transfer liquid received via the inlet 7 is directed toward the outlet casing 4. The heat transfer liquid admitted through the inlet 7 of the inlet casing 3 of the housing 2 is thus transferred toward the outlet casing 4 in order to be heated therein before being discharged.

In order to allow the heat transfer liquid to be discharged, the outlet casing 4 has at least one heat transfer liquid outlet 11. According to the illustrated example, the heat transfer liquid outlet 11 is produced in the form of an outlet pipe 11, for example, arranged as a projection on the outlet casing 4. The outlet pipe 11 is intended to be connected to a heat transfer liquid circuit, such as the water heating circuit.

This outlet casing 4 contains one or more heating elements 13 (see FIG. 2), for example, through the Joule effect. In particular, the element or the heating elements 13 comprise at least one electric means for heating the fluid, such as a heating resistor.

Figure 2:
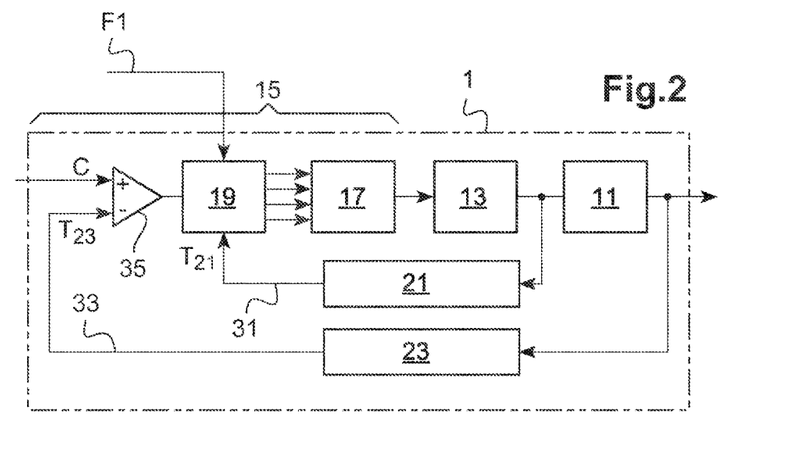
FIG. 2 is a block diagram of a method for heating a heat transfer liquid received in the electric heating device according to the first embodiment.

In this case, the heater 1 comprises a control module 15 or an electronic control module 15 for the one or more heating elements 13. With reference to FIGS. 1 and 2, the heater 1 is controlled and electrically powered by means of cables 6 connected to an electric power source of the vehicle and to the control module 15.

The control module 15 is connected to a central unit (not shown) of a motor vehicle equipped with the heater 1 via one or more electric communication wires. This central unit (not shown) can particularly transmit electric consumption limitation information to the control module 15, as is schematically shown by the arrow F1. The central unit (not shown) can also transmit a heating setpoint C to the control module 15.

Furthermore, the control module 15 is configured to send control signals to the heating element 13. By way of a non-limiting example, it can involve periodic control signals, with pulse width modulation, known by the acronym PWM "Pulse Width Modulation". The operating power can be communicated by virtue of the duty cycle of the PWM signal, with this duty cycle being defined by the ratio between the holding duration in the high state and the period of the PWM signal.

The control module 15 comprises the electric and/or electronic components mounted in the internal space of the inlet casing 3. By way of an example, the control module 15 can comprise at least one supply switch 17, such as a power transistor, able to authorize or prevent the supply of the heating element 13. The supply switch 17, in particular its opening and/or closing, can be controlled by a control circuit 19 particularly comprising a microcontroller.

The electric and/or electronic components of the control module 15 can be mounted on an electric circuit support (not shown), such as a printed circuit board (PCB).

The control module 15 also comprises at least one means for using a measurement signal, as described hereafter.

Furthermore, the heater 1 comprises at least one first temperature sensor 21 arranged so as to measure the temperature of the one or more heating elements 13. The first temperature sensor 21 can comprise a temperature sensitive element such as a thermistor. It particularly involves a negative temperature coefficient thermistor, which is abbreviated as "NTC" (Negative Temperature Coefficient), i.e. for which the resistance uniformly decreases with the temperature. The one or each first temperature sensor 21 is arranged directly on the associated heating element 13, for example, by being fixed, for example, by bonding or brazing, on the outer surface of the associated heating element 13.

Also, at least one second temperature sensor 23 is provided that is configured to measure the temperature of the heat transfer liquid at the outlet 11. In a similar manner to the first temperature sensor 21, the second temperature sensor 23, which, for example, is made of brass, can comprise a temperature sensitive element such as a thermistor. In particular, it is a negative temperature coefficient thermistor.

Again with reference to FIG. 1, the second temperature sensor 23 can be fixed on the outer surface of the outlet pipe 11, as is schematically shown by a solid line outline of a block schematically showing the second temperature sensor 23. By way of a variant, the second temperature sensor 23 can be fixed in the vicinity of the outlet pipe 11, on the outlet casing 4, as is schematically shown by a dashed line outline of a block schematically showing the second temperature sensor 23.

Advantageously, the second temperature sensor 23 is arranged so that, during operation of the heater 1, the thermistor is immersed in the liquid at the outlet of the heater 1.

Examples of temperature sensors, more specifically of second temperature sensors 23, are shown in FIGS. 3a to 3c and 4 and 5.

Figure 3A:
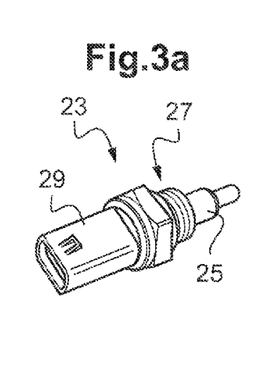
FIG. 3a is a perspective view of a first example of a temperature sensor for the electric heating device.
Figure 3B:
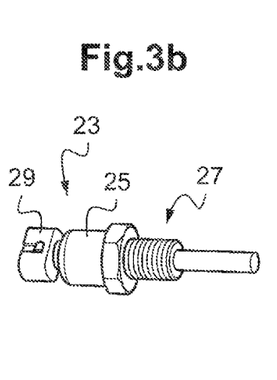
FIG. 3b is a perspective view of a second example of a temperature sensor for the electric heating device.
Figure 3C:
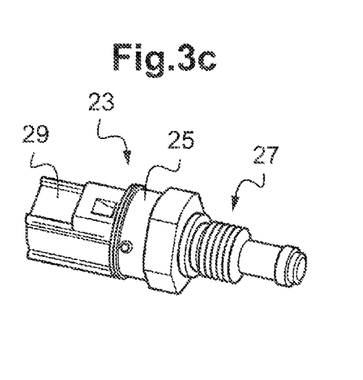
FIG. 3c is a perspective view of a third example of a temperature sensor for the electric heating device.
Figure 4:
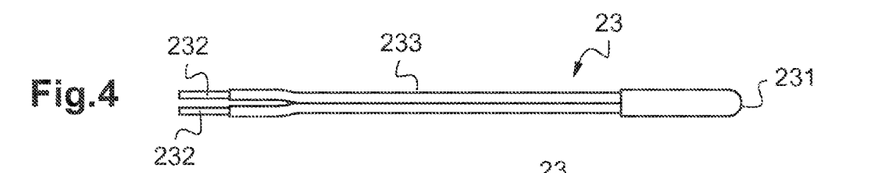
FIG. 4 is a first example of a temperature sensor configured to be molded on the electric heating device.

In the examples of FIGS. 3a to 3c, the second temperature sensor 23 comprises a protection casing 25 housing the thermistor. The protection casing 25 is advantageously at least partly produced from a metal material that is resistant to high temperatures and exhibits very good thermal conduction. By way of a non-limiting example and in a non-exhaustive manner, metal materials can be cited with thermal conductivity that is greater than 50 $W \cdot m^{-1} \cdot K^{-1}$, preferably of the order of 100 $W \cdot m^{-1} \cdot K^{-1}$ to 300 $W \cdot m^{-1} \cdot K^{-1}$, even greater than 300 $W \cdot m^{-1} \cdot K^{-1}$. It involves, for example, metal materials of the copper or brass type.

Furthermore, by way of a non-limiting example, each casing 25 can also comprise a fixing system 27 on an outer wall of the outlet 11 defining the environment in which the temperature is to be determined. In a non-limiting manner, it can involve, for example, a fixing system by clamping, such as a screwing system, as shown in FIGS. 3a to 3c, or even using a clamp fixed on the outlet casing 4.

A connection terminal 29 also can be provided for the connection between the electric wires connected to the thermistor and the electric wires 31, 33 (see FIG. 2) for routing the electric information to the control module 15.

By way of a variant, the second temperature sensor 23 can be molded directly on the heater 1, more specifically, on the outlet casing 4 in the vicinity of or directly on the outlet pipe 11. In this case, the thermistor 231 and the wires 232 of the second temperature sensor 23 shown in FIGS. 4 and 5 can be molded directly on the outlet casing 4, for example, directly on or in the vicinity of the outlet pipe 11, without requiring a protection casing 25, as previously described with reference to FIGS. 3a to 3c.

Figure 5:
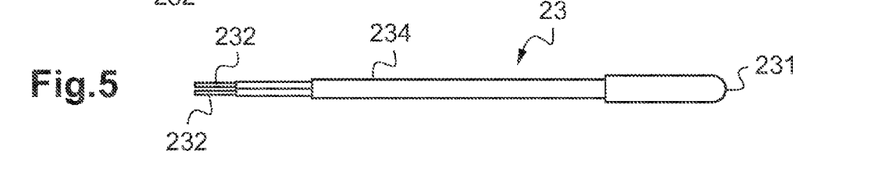
FIG. 5 is a second example of a temperature sensor configured to be molded on the electric heating device.

Furthermore, provision equally can be made for a single isolating layer 233 (FIG. 4) and a double insulating layer 234 (FIG. 5).

Again with reference to FIG. 2, the control module 15 can receive information representing temperatures $T_{21}$ and $T_{23}$ respectively measured by the first temperature sensor 21 and by the second temperature sensor 23. The control module 15 also can control the supply and modify the control of the one or more heating elements 13 as a function of the heating setpoint C and of the temperatures $T_{21}$ and $T_{23}$ respectively measured by the first temperature sensor 21 and by the second temperature sensor 23.

More specifically, the control module 15 can adapt the control of the heating element 13 as a function of the temperature information $T_{21}$ and $T_{23}$ measured by the first and second temperature sensors 21, 23, so as to regulate the temperature of the liquid. This temperature regulation then occurs inside the heating device 1 and no longer on the central unit (not shown) of the motor vehicle that transmitted the heating setpoint C.

To this end, each first temperature sensor 21 and each second sensor 23 can comprise at least one means for transmitting, to the control module 15, information representing the resistance of the thermistor and, consequently, the measured temperature $T_{21}$, $T_{23}$. In the example that is described, each temperature sensor 21, 23, in particular the thermistor thereof, is connected to at least one processing means of the control module 15 via the electric wires schematically shown by the arrows 31 and 33. These electric wires allow electric information to be routed that represents the resistance of the thermistor and, consequently, the temperature $T_{21}$, $T_{23}$ measured by the thermistors of the temperature sensors 21, 23.

The control module 15 therefore comprises at least one processing means configured to use information originating from the temperature sensors 21 and 23 and to generate a command for the heating element as a function of the temperature information, so as to regulate the temperature of the fluid inside the heater 1.

More specifically, the control module 15 comprises at least one processing means for receiving and using a measurement signal originating from the first temperature sensor 21. It can involve a processing means of the control circuit 19 of the control module 15. The first temperature sensor 21, in particular the thermistor thereof, is connected via the electric wires schematically shown by the arrow 31 to the processing means of the control circuit 19. The processing means can detect an event or, more particularly, a fault, such as overheating of the heating element 13, based on this information. For example, in the event of the detection of excessive temperature or of overheating, the control circuit 19 comprises at least one processing means for sending a signal for deactivating the faulty heating element 13, i.e., in this case overheating, to the corresponding supply switch 17.

Furthermore, the control module 15 comprises at least one processing means for receiving and using a measurement signal originating from the second temperature sensor 23. The second temperature sensor 23, in particular the thermistor thereof, is connected via the electric wires schematically shown by the arrow 33 to this processing means. It particularly can involve a processing means of a comparator 35 of the control module 15. In this case, the heating setpoint C can be received on a first input of the comparator 35 and the electric information representing the resistance of the thermistor of the second temperature sensor 23, and therefore of the measured temperature $T_{23}$, can be received on a second input of the comparator 35 and compared to the heating setpoint C. The first input of the comparator 35 can be a positive input and the second input of the comparator 35 can be a negative input.

The comparator 35 can comprise at least one means for sending the results of this comparison.

The result of the comparison can be transmitted to at least one reception means of the control circuit 19. Depending on this comparison result, at least one processing means of the control circuit 19 can determine and generate a signal for controlling and/or supplying the heating element 13.

In particular, this signal can comprise at least one item of information relating to electric power to be injected into the one or more heating elements 13, while taking into account the possible difference between the value of the heating setpoint C and the effective value of the temperature of the heat transfer liquid measured at the outlet 11 of the heater 1.

Thus, in the case of PWM control signals, by taking into account the temperature information $T_{21}$ and $T_{23}$ measured by the first and second temperature sensors 21, 23, the control circuit 19 can, by way of a non-limiting example, particularly act on the modulation rate, on the duty cycle or even on the number of heating elements 13 to be activated, in order to be able to reach the heating setpoint at the outlet 11 of the heater 1. In this case, the control and/or supply signal transmitted by the control circuit 19 comprises at least one item of pulse width modulation PWM information.

This modification of the control signals occurs directly inside the heater 1 and not in the central unit (not shown) of the motor vehicle.

Advantageously, in order to optimize the management of the temperature of the heat transfer liquid, the control circuit 19 can also take into account the thermal inertia, the thermal capacity and other features of the one or more heating elements 13 or of thermal features of the fluid.

Second Embodiment

Figure 6:
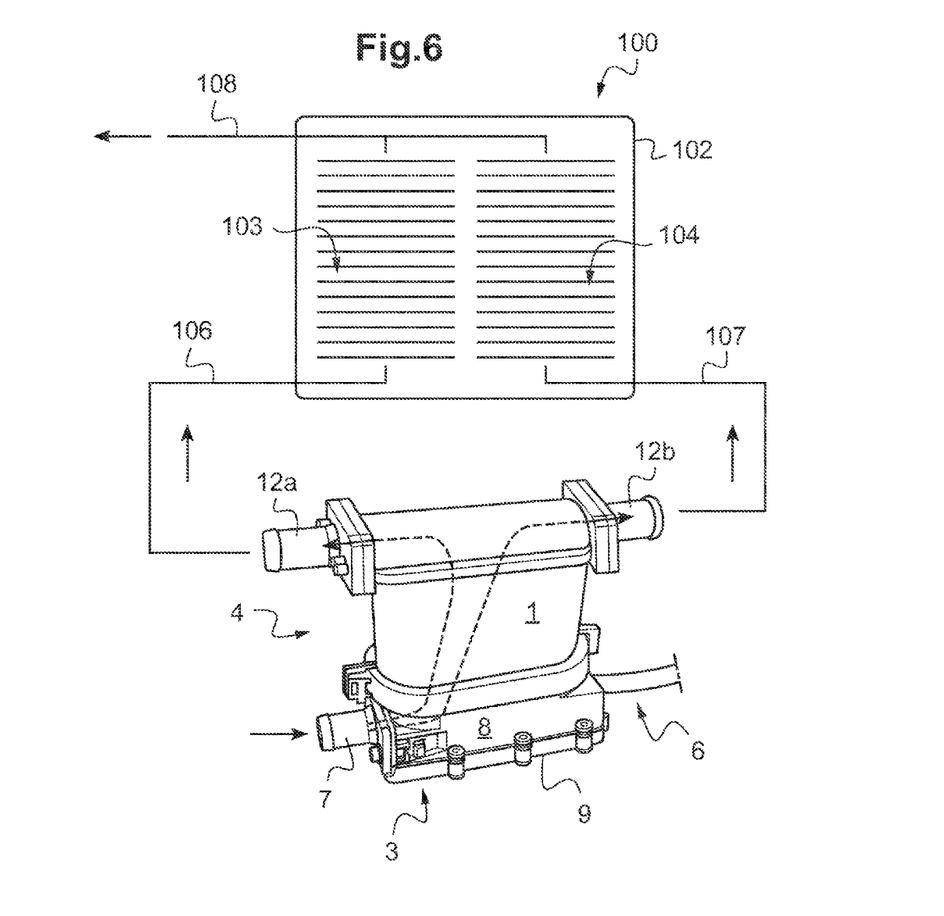
FIG. 6 is a schematic representation of a heating circuit comprising an electric heating device according to a second embodiment shown as a perspective view and comprising two radiators combined within a single component.
Figure 7:
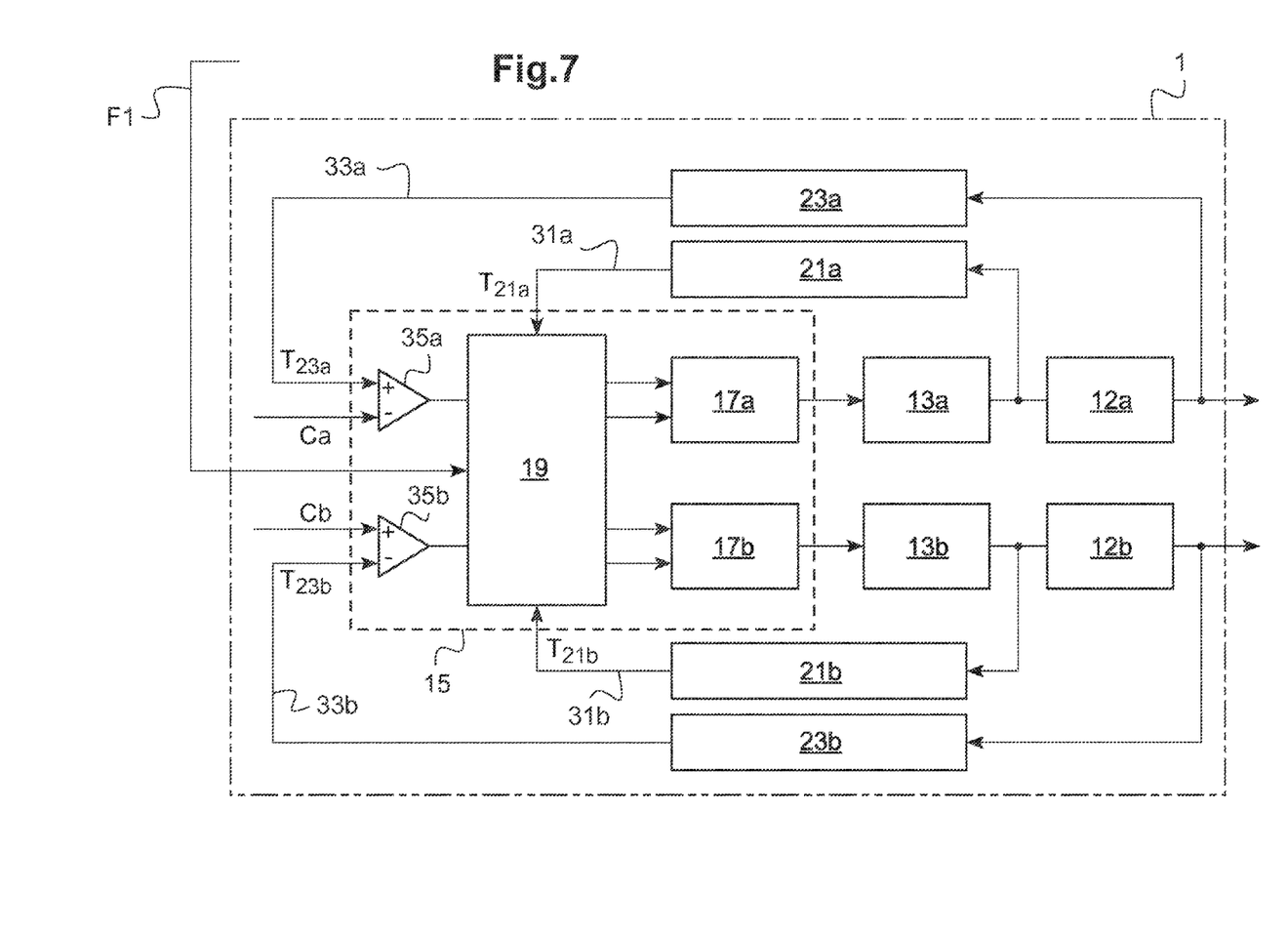
FIG. 7 is a block diagram of a method for heating a heat transfer liquid received in the electric heating device according to the second embodiment.

A second embodiment is shown in FIGS. 6 and 7. This second embodiment differs from the first embodiment by the fact that the electric heater 1 that comprises a single inlet or intake 7 for the heat transfer liquid comprises a first fluid outlet 12a and a second fluid outlet 12b that are separate from each other.

According to this second embodiment, for a heating circuit 100, which is schematically shown in FIG. 6, the same component 102, such as a heat diffusion component 102, is provided to jointly provide the heating and the distribution of the heat of the heat transfer liquid directed toward a first and a second heat exchanger 103, 104, such as separate radiators of the heating circuit 100.

This allows regulation, according to two setpoint temperatures Ca and Cb (FIG. 7), of two distinct regions of the interior, for example, the left-hand part and the right-hand part of the interior of the motor vehicle, or the front and rear parts of the vehicle.

More specifically, the two separate radiators 103 and 104 allow the heat to be respectively diffused toward the left-hand part and the right-hand part of the interior of the motor vehicle equipped with this heating circuit 100 (FIG. 6).

By way of a variant or in addition, two separate heating loops can be provided, one heating loop for heating the interior and another loop allowing, for example, and by being by no means limiting, floor heating to be heated or even a battery of the vehicle to be conditioned. In this case, the first heat exchanger 103 can be in the first loop and can heat the interior according to a first setpoint Ca, whereas the second heat exchanger 104 can be in the second loop, for example, for heating the floor heating or for conditioning a battery according to a second setpoint Cb.

According to this alternative, the two radiators 103 and 104 are not necessarily both dedicated to heating the interior.

Each radiator 103, 104 comprises an inlet that is specific thereto, with these inlets respectfully being referenced 106 and 107. The outlets of these two radiators 103, 104 can be combined into the same outlet referenced 108.

The outlets 12a and 12b of the heater 1 are respectively connected to the inlet 106 and to the inlet 107 of the radiators 103 and 104.

The outlet 108 of the component 102 that combines the radiator outlets 103 and 104 can, for its part, be connected to the inlet 7 of the heater 1. Other components of the circuit, not shown, can, where necessary, be interposed between the outlet 108 of the radiators and the inlet 7 of the heater 1.

The heater 1 is configured to heat the heat transfer liquid that it receives at the inlet 7 and to distribute the thermal heating power in a controlled manner between one portion of the liquid that is directed toward its first outlet 12a and the other portion of the liquid that is directed toward its second outlet 12b. In other words, this heater 1 is capable of delivering heat transfer liquid to the first outlet 12a at a first temperature different from the second temperature of the heat transfer liquid that it delivers to its second outlet 12b.

In the example of FIG. 7, the heater 1 can comprise, inside the outlet casing 4, at least one first and one second heating element 13a and 13b, for example, through the Joule effect, respectively associated with the first and second radiators 103, 104 shown in FIG. 6.

The first heating element 13a is connected to the first outlet 12a and is configured to electrically heat, to the first temperature, the portion of the heat transfer liquid that is intended to flow through the first outlet 12a.

The second heating element 13b is connected to the second outlet 12b and is configured to electrically heat, to the second temperature, the portion of the heat transfer liquid intended to flow through the second outlet 12b.

According to the second embodiment, during the operation of the heater 1, the heat transfer liquid admitted into the inlet casing 3 via the inlet 7 enters two channels (not shown in the figures), so as to form two separate streams of liquid. These two streams of liquid respectively pass through a heating element 13a or 13b, so as to be variously heated to the first temperature and to the second temperature different from the first temperature.

With reference to FIGS. 6 and 7, the liquid heated by the first heating element 13a is discharged toward the first outlet 12a in order to supply the first radiator 103, whereas the liquid heated by the second heating element 13b is discharged toward the second outlet 12b in order to supply the second radiator 104.

As previously, according to the first embodiment, the heater 1 comprises a control module 15.

This control module 15 supplies the two heating elements 13a, 13b from the electric power and the control instructions received on the cables 6 (see FIG. 6).

In particular, again with reference to FIG. 7, the control module 15 can comprise a control circuit 19 configured to control two supply switches 17a and 17b respectively dedicated to an associated heating element 13a, 13b, so as to supply the two heating elements 13a and 13b with different powers, in accordance with control instructions received by the control circuit 19.

To this end, as many supply switches 17a, 17b are provided as there are heating elements 13a, 13b. In this example, two supply switches 17a, 17b are provided.

Furthermore, a first temperature sensor 21a, 21b is also provided for each heating element 13a, 13b and a second temperature sensor 23a, 23b is also provided for each fluid outlet 12a, 12b.

The control module 15 can control the supply of the two heating elements 13a, 13b as a function of two heating setpoints Ca, Cb and the temperatures $T_{21}a$, $T_{21b}$ measured by the first temperature sensors 21a and 21b and the temperatures $T_{23a}$, $T_{23b}$ measured by the second temperature sensors 23a and 23b.

In a similar manner to the first embodiment, each first temperature sensor 21a, 21b associated with a heating element 13a, 13b is connected to at least one processing means, for example, of the control circuit 19, that is configured to receive and use a measurement signal, via electric wires schematically shown by the arrows 31a, 31b that allow electric information to be routed that represents the temperature $T_{21a}$, $T_{21b}$ measured by the first temperature sensors 21a, 21b.

Similarly, each second temperature sensor 23a, 23b associated with an outlet 12a, 12b is connected to at least one processing means for receiving and using a measurement signal. It involves, for example, a processing means of a comparator 35a, 35b connected via electric wires, schematically shown by the arrows 33a, 33b, that allow electric information to be routed that represents the temperature T23a, T23b measured by the second temperature sensors 23a, 23b on the respective comparators 35a, 35b.

In this case,
- a first heating setpoint Ca can be received on a first inlet of a first comparator 35a; and
- the electric information representing the resistance of the thermistor of the second temperature sensor 23a associated with the first outlet 12a of the heater 1, and therefore the measured temperature $T_{23a}$, can be received on a second inlet of the first comparator 35a and compared to the first heating setpoint Ca.

Depending on this comparison result, at least one processing means of the control circuit 19 can determine or adapt a signal for controlling and/or supplying the first heating element 13a. In particular, this signal can include at least one item of information relating to electric power to be injected into the first heating element 13a, while taking into account the possible difference between the value of the first heating setpoint Ca and the effective value of the temperature of the heat transfer liquid measured at the first outlet 12a of the heater 1.

Similarly,
a second heating setpoint Cb can be received on a first inlet of a second comparator 35b; and
the electric information representing the resistance of the thermistor of the second temperature sensor 23b associated with a second outlet 12b of the heater 1, and therefore with the measured temperature $T_{23}b$, can be received on a second inlet of the second comparator 35b and compared to the second heating setpoint Cb.

Depending on this comparison result, at least one processing means of the control circuit 19 can determine or adapt a signal for controlling and/or supplying the second heating element 13b. In particular, this signal can include at least one item of information relating to electric power to be injected into the second heating element 13b, while taking into account the possible difference between the value of the second heating setpoint Cb and the effective value of the temperature of the heat transfer liquid measured at the second outlet 12b of the heater 1.

Thus, the control module 15 can control the supply and modify the control of each heating element 13a, 13b as a function of each heating setpoint Ca, Cb and of the temperatures $T_{21a}$, $T_{21b}$ and $T_{23a}$, $T_{23b}$ respectively measured by each first temperature sensor 21a, 21b and by each second temperature sensor 23a, 23b.

Method

A method will now be described, with reference to FIGS. 2 and 7, for managing the temperature of a fluid, such as a heat transfer liquid, inside a heater 1 as previously described.

The method comprises a step of measuring the temperature $T_{21}$ or $T_{21a}$, $T_{21b}$ of each heating element 13 or 13a, 13b. This step is performed by each first temperature sensor 21 or 21a, 21b associated with a heating element 13 or 13a, 13b.

Once the measurement is completed, the method comprises a step of sending or transmitting at least one item of electric information representing the temperature of the associated heating element 13 or 13a, 13b to the control module 15.

The method also comprises a step of measuring the temperature of the liquid $T_{23}$ at the outlet 11 of the heater 1 according to the first embodiment (FIG. 2) or $T_{23a}$, $T_{23b}$ at each outlet 12a, 12b according to the second embodiment (FIG. 7). This measurement can be performed by the second temperature sensor 23 or by each second temperature sensor 23a, 23b.

This measurement step is followed by a step of sending or transmitting at least one item of electric information representing the temperature of the fluid $T_{23}$ at the outlet 11 or $T_{23a}$, $T_{23b}$ at each outlet 12a, 12b.

Upon receipt of this information, the control module 15 determines, for each heating element 13 or 13a, 13b, a signal for controlling and/or supplying the heating element 13 or each heating element 13a, 13b. Such a signal is determined as a function of the temperature information of the first and second temperature sensors 21 and 23, according to the first embodiment. Or, according to the second embodiment, such a signal is determined, on the one hand, for the first heating element 13a as a function of the temperature information of the first and second temperature sensors 21a and 23a and, on the other hand, for the second heating element 13b as a function of the temperature information of the first and second temperature sensors 21b and 23b. The temperature of the liquid inside the same heater 1 is thus regulated.

Advantageously, the method comprises a step of comparing the temperature $T_{21}$ or $T_{21a}$, $T_{21b}$ measured by a first sensor 21 or 21a, 21b with a threshold temperature. The selected threshold temperature represents an excessive temperature corresponding to overheating or that risks resulting in overheating of the associated heating element 13, 13a, 13b.

Preferably, the method comprises a step of comparing the temperature $T_{23}$ measured by a second sensor 23 with the heating setpoint C according to the first embodiment. In a heater 1 according to the second embodiment, the method comprises a step of comparing the temperature $T_{23a}$, $T_{23b}$, respectively, measured by a second sensor 23a, 23b, respectively, with the associated heating setpoint Ca and Cb, respectively.

Furthermore, the method can comprise a step in which the control module 15 of the heater 1 according to either of the embodiments determines which heating element 13; 13a, 13b is to be activated as a function of the temperature information of the first and second temperature sensors 21, 23 or 21a, 23a and 21b, 23b. Finally, the microcontroller of the control module 15 can control each supply switch 17; 17a, 17b in order to activate or deactivate the associated heating element 13; 13a, 13b.

Of course, the order of at least some of the steps of this method can be reversed.

Thus, with one or more second temperature sensors 23; 23a, 23b at the outlet 11 or at each outlet 12a, 12b of the heater 1, the setpoint C; Ca, Cb will be the target to be reached and, as a function of the temperature of the liquid measured at the one or at each outlet 11; 12a, 12b of the heater 1, the control of each heating element 13; 13a, 13b will be adapted and controlled directly by the control module 15 of the heater 1.

This simplifies the management of the heating of the heat transfer liquid for the motor vehicle manufacturer.

Furthermore, this information is correlated with temperature information measured by one or more first temperature sensors 21; 21a, 21b in order to limit the risks of overheating.

In the present document, embodiments of electric heating devices 1 have been described that are intended to be connected to a circuit for heating heat transfer liquid, such as water, for heating the interior of an electric or hybrid vehicle. Of course, the electric heating device 1 according to the invention can be connected to any other loop or to any other heating and/or air conditioning unit of a motor vehicle.

The invention claimed is:

1. An electric fluid heating device for a motor vehicle, comprising:
at least one fluid inlet;
a first fluid outlet;
a second fluid outlet;
a first heating element connected to the first fluid outlet, configured to electrically heat, to a first temperature, a portion of the heat transfer liquid that flows through the first outlet;
a second heating element connected to the second fluid outlet, configured to electrically heat, to a second temperature different from the first temperature, another portion of the heat transfer liquid intended to flow through the second outlet;

for each heating element, at least one first associated temperature sensor arranged so as to measure the temperature of the associated heating element;

for each fluid outlet, at least one second associated temperature sensor arranged so as to measure the temperature of the fluid at the associated outlet; and a control module for said first and second heating elements;

wherein the control module comprises at least one processing means for:
  using the temperature information of the first and second temperature sensors; and
  generating a command for at least one of the first and second heating elements as a function of the temperature information of the first and second temperature sensors, so as to regulate the temperature of the fluid inside the heating device.

2. The device as claimed in claim 1, wherein said at least one second temperature sensor is molded on said device.

3. The device as claimed in claim 1, wherein at least one of the first and second temperature sensors comprises a temperature sensitive element.

4. The device as claimed in claim 3, wherein the temperature sensitive element of said at least one second temperature sensor is arranged so as to be immersed in the fluid during operation of said device.

5. The device as claimed in claim 3, wherein the temperature sensitive element is a negative temperature coefficient thermistor.

6. The device as claimed in claim 3, wherein the temperature sensitive element of said at least one of the first and second temperature sensors is electrically connected to the control module.

7. The device as claimed in claim 6, wherein the control module comprises at least one comparator configured to:
  receive a heating setpoint at a first inlet; and
  receive electric information at a second inlet representing the temperature of the fluid at said at least one of the first and second outlets measured by said at least one second temperature sensor.

8. The device as claimed in claim 7, wherein the comparator is configured to compare the electric information representing the temperature of the fluid with the heating setpoint.

9. The device as claimed in claim 8, wherein at least one processing means of the control module is configured to determine a signal for controlling and/or supplying at least one of the first and second heating elements as a function of the result of the comparison between the electric information representing the temperature of the fluid and the heating setpoint.

10. A heating circuit for an interior of a vehicle, comprising:
  at least one electric heating device having:
  at least one fluid inlet,
  a first fluid outlet,
  a second fluid outlet,
  a first heating element connected to the first fluid outlet, configured to electrically heat, to a first temperature, a portion of the heat transfer liquid that flows through the first outlet,
  a second heating element connected to the second fluid outlet, configured to electrically heat, to a second temperature different from the first temperature, another portion of the heat transfer liquid intended to flow through the second outlet,
  for each heating element, at least one first associated temperature sensor arranged so as to measure the temperature of the associated heating element,
  for each fluid outlet, at least one second associated temperature sensor arranged so as to measure the temperature of the fluid at the associated outlet, and
  a control module for said first and second heating elements,
  wherein the control module comprises at least one processing means for:
    using the temperature information of the first and second temperature sensors; and
    generating a command for at least one of the first and second heating elements as a function of the temperature information of the first and second temperature sensors, so as to regulate the temperature of the fluid inside the heating device.

11. The heating circuit as claimed in claim 10, said circuit further comprising at least one first and one second heat exchanger configured to diffuse heat toward two distinct regions of the interior of the vehicle, and wherein the first fluid outlet of said device is connected to the first heat exchanger, and the second fluid outlet of said device is connected to the second heat exchanger.

12. A method for managing the temperature of a fluid inside an electric heating device as claimed in claim 1, said method comprising:
  each first temperature sensor measures the temperature of an associated heating element;
  each first temperature sensor transmits at least one item of electric information representing the temperature of the associated heating element to the control module;
  each second temperature sensor measures the temperature of the fluid on at least one associated outlet of said device;
  each second temperature sensor transmits at least one item of electric information, representing the temperature of the fluid at said at least one outlet of said device, to the control module;
  the control module determines, for each heating element, a signal for controlling and/or supplying the heating element as a function of temperature information of the first and second temperature sensors, so as to regulate the temperature of the fluid inside the heating device.

13. The temperature management method as claimed in claim 12, wherein the control module determines which heating element must be activated according to temperature information of the first and second temperature sensors.

14. The temperature management method as claimed in claim 13, wherein the control module comprises at least one microcontroller and at least one supply switch for each heating element, and wherein the microcontroller controls each supply switch so as to activate or deactivate the associated heating element.

* * * * *